United States Patent
O'Sullivan et al.

(10) Patent No.: US 8,601,080 B2
(45) Date of Patent: *Dec. 3, 2013

(54) SHARING EMAIL (71) Applicant: International Business Machines Corporation, Armonk, NY (US)

(72) Inventors: Patrick Joseph O'Sullivan, Ballsbridge (IE); Liam Harpur, Skerries (IE); Fred Raguillat, Meath (IE); Daniel Terlizzi, Mulhuddart (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/628,459

(22) Filed: Sep. 27, 2012

(65) Prior Publication Data

US 2013/0024534 A1 Jan. 24, 2013

Related U.S. Application Data (63) Continuation of application No. 12/345,943, filed on Dec. 30, 2008, now Pat. No. 8,321,514.

(51) Int. Cl.
*G06F 15/16* (2006.01)
(52) U.S. Cl.
USPC ........... 709/206; 709/202; 709/203; 709/205; 709/207
(58) Field of Classification Search
USPC .................. 709/206, 202, 203, 205, 207
See application file for complete search history.

(56) References Cited

U.S. PATENT DOCUMENTS

| | | | |
|---|---|---|---|
| 5,530,861 | A | 6/1996 | Diamant et al. |
| 5,944,787 | A | 8/1999 | Zoken |
| 6,012,066 | A | 1/2000 | Discount et al. |
| 6,026,410 | A | 2/2000 | Allen et al. |
| 6,175,831 | B1 | 1/2001 | Weinreich et al. |
| 6,185,603 | B1 | 2/2001 | Henderson et al. |
| 6,205,432 | B1 | 3/2001 | Gabbard et al. |
| 6,263,064 | B1 | 7/2001 | O'Neal et al. |
| 6,301,607 | B2 | 10/2001 | Barraclough et al. |
| 6,324,587 | B1 | 11/2001 | Trenbeath et al. |
| 6,421,678 | B2 | 7/2002 | Smiga et al. |
| 6,463,145 | B1 | 10/2002 | O'Neal et al. |
| 6,477,240 | B1 | 11/2002 | Lim et al. |
| 6,489,980 | B1 | 12/2002 | Scott et al. |
| 6,525,747 | B1 | 2/2003 | Bezos |
| 6,535,228 | B1 | 3/2003 | Bandaru et al. |
| 6,574,599 | B1 | 6/2003 | Lim et al. |
| 6,581,105 | B2 | 6/2003 | Miloslavsky et al. |
| 6,615,241 | B1 | 9/2003 | Miller et al. |
| 6,618,748 | B1 | 9/2003 | Bates et al. |
| 6,622,147 | B1 | 9/2003 | Smiga et al. |
| 6,643,687 | B1 | 11/2003 | Dickie et al. |
| 6,668,281 | B1 | 12/2003 | Ayyadurai |
| 6,675,205 | B2 | 1/2004 | Meadway et al. |
| 6,691,155 | B2 | 2/2004 | Gottfried |
| 6,697,824 | B1 | 2/2004 | Bowman-Amuah |

(Continued)

*Primary Examiner* — Lan-Dai T Truong
*Assistant Examiner* — Thu Nguyen
(74) *Attorney, Agent, or Firm* — Holland & Knight, LLP; Brian J. Colandreo, Esq.; Jeffrey T. Placker, Esq.

(57) ABSTRACT

A trust relationship may be established between a first email user and at least a second email user. At least one email message received by the second user is automatically propagated to the first user based upon, at least in part, the trust relationship.

23 Claims, 5 Drawing Sheets

(56) References Cited

U.S. PATENT DOCUMENTS

| | | |
|---|---|---|
| 6,728,690 B1 | 4/2004 | Meek et al. |
| 6,732,090 B2 | 5/2004 | Shanahan et al. |
| 6,732,156 B2 | 5/2004 | Miloslavsky |
| 6,732,157 B1 | 5/2004 | Gordon et al. |
| 6,757,830 B1 | 6/2004 | Tarbotton et al. |
| 6,772,196 B1 | 8/2004 | Kirsch et al. |
| 6,822,940 B1 | 11/2004 | Zavalkovsky et al. |
| 6,874,023 B1 | 3/2005 | Pennell et al. |
| 6,938,065 B2 | 8/2005 | Jain |
| 7,028,075 B2 | 4/2006 | Morris |
| 7,058,543 B2 | 6/2006 | Takahashi et al. |
| 7,079,275 B2 | 7/2006 | Henry et al. |
| 7,117,210 B2 | 10/2006 | DeSalvo |
| 7,136,920 B2 | 11/2006 | Castell et al. |
| 7,146,381 B1 | 12/2006 | Allen et al. |
| 2004/0221012 A1 | 11/2004 | Heumesser |
| 2006/0294192 A1 | 12/2006 | Mao et al. |
| 2008/0307063 A1 | 12/2008 | Caughey |
| 2009/0006572 A1 | 1/2009 | Fuisz |
| 2009/0254625 A1 | 10/2009 | Levy |
| 2009/0276467 A1 | 11/2009 | Scholtes et al. |
| 2010/0313243 A1 | 12/2010 | Bansal et al. |

SHARING EMAIL

RELATED APPLICATIONS

The subject application is a continuation application of U.S. patent application with Ser. No. 12/345,943, filed on Dec. 30, 2008, the entire content of which is herein incorporated by reference.

BACKGROUND OF THE INVENTION

This disclosure relates to sharing email and, more particularly, to sharing emails amongst multiple users.

Situations may arise in organizations in which individuals miss key correspondences simply because they were not included on an email. Often, the email originator simply forgets to add the person to the email list or the email originator does not have a clear grasp on who should be included on the email list.

Conventional email systems may provide rudimentary workarounds. For example, an email recipient can forward the email to the omitted person, who was left off of the email list, or the omitted person, who was left off of the email list, may ask the email originator to update the email list. Unfortunately, forwarding an email has a point in time benefit and subsequent emails associated with the original email may not be forwarded to the omitted person, who was left off of the email list. Further, asking the email originator to add recipients to an email list requires manual interaction and steps.

In situations where an organization manages multiple emails and email threads, this situation may be frustrating for the email originator who has to cope with multiple requests for additions to email lists. Further, while an originally omitted person may review the email communications of another person, this is a manual procedure that requires the omitted person to proactively police the email communications of another.

SUMMARY OF DISCLOSURE

In a first implementation, a method includes establishing a trust relationship between a first email user and at least a second email user. At least one email message received by the second user is automatically propagated to the first user based upon, at least in part, the trust relationship.

According to another implementation, a computer program product resides on a computer readable medium having a plurality of instructions on it. When executed by a processor, the instructions cause the processor to perform operations including establishing a trust relationship between a first email user and at least a second email user. At least one email message received by the second user is automatically propagated to the first user based upon, at least in part, the trust relationship.

In another implementation, a computing system includes at least one processor and at least one memory architecture coupled with the at least one processor. A first software module is executed on the at least one processor and the at least one memory architecture. The first software module is configured to establish a trust relationship between a first email user and at least a second email user. A second software module is executed on the at least one processor and the at least one memory architecture. The second software module is configured to automatically propagate at least one email message received by the second user to the first user based upon, at least in part, the trust relationship.

The details of one or more implementations are set forth in the accompanying drawings and the description below. Other features will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
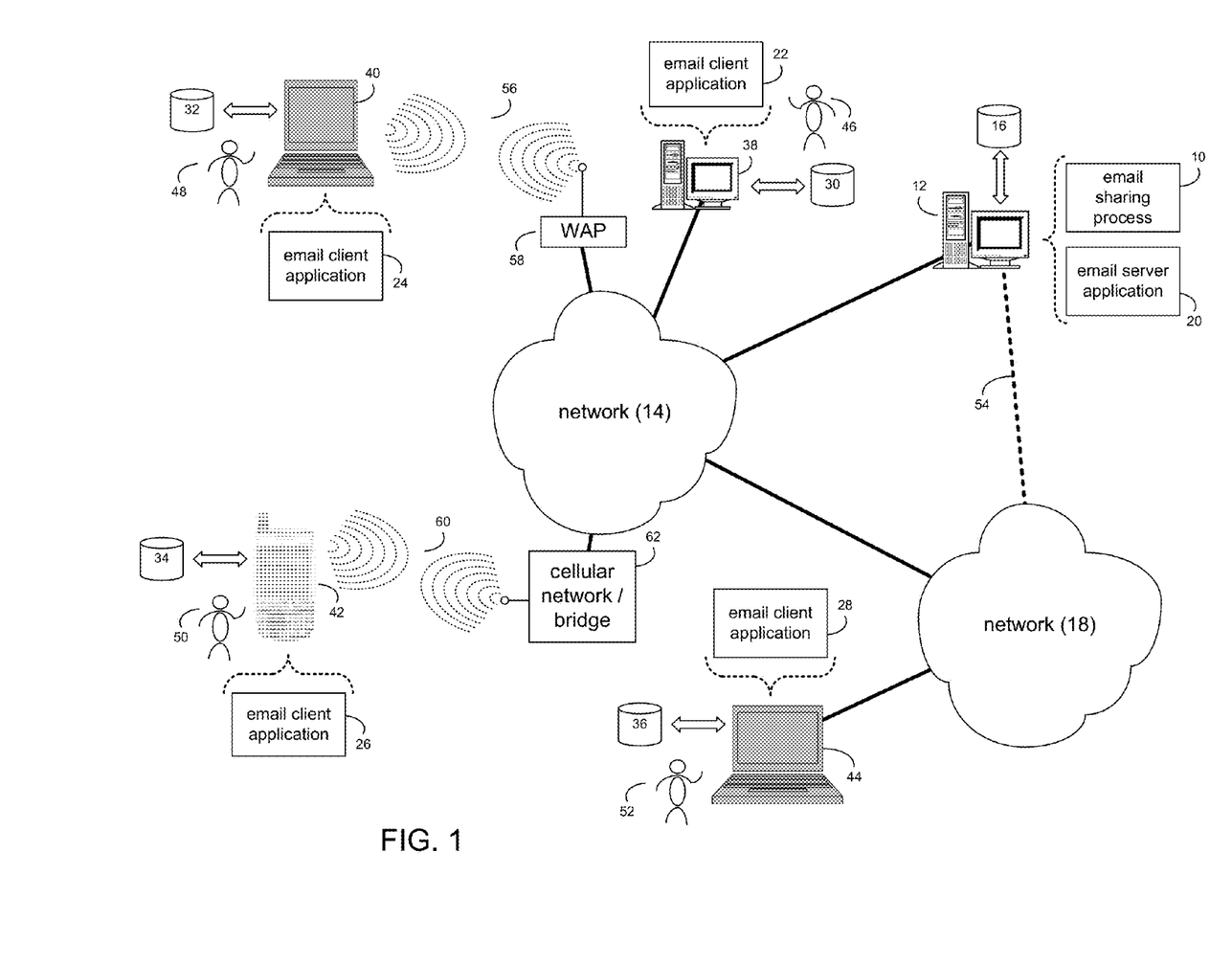
FIG. 1 is a diagrammatic view of an email sharing process, an email client application and an email server application coupled to a distributed computing network.

Referring to FIG. 1, there is shown email sharing process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

As will be discussed below in greater detail, email sharing process 10 may establish a trust relationship between a first email user and at least a second email user. At least one email message received by the second user may be automatically propagated to the first user based upon, at least in part, the trust relationship.

The instruction sets and subroutines of email sharing process 10, which may be configured as one or more software modules, and which may be stored on storage device 16 coupled to server computer 12, may be executed by one or more processors (not shown) and one or more memory architectures (not shown) incorporated into server computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute email server application 20, examples of which may include but are not limited to Lotus Domino® Server and Microsoft Exchange Server® (Domino is a trademark of International Business Machines Corporation in the United States, other countries, or both; and Microsoft Exchange Server is a registered trademark of Microsoft Corporation in the United States, other countries, or both). Email server application 20 may be a messaging and collaboration software platform that may allow for user collaboration via email client applications 22, 24, 26, 28, examples of which may include but are not limited to Lotus Notes® and Microsoft Outlook® (Lotus Notes is a trademark of International Business Machines Corporation in the United States, other countries, or both; and Outlook is a registered trademark of Microsoft Corporation in the United States, other countries, or both). Email sharing process 10 may be a stand alone application that interfaces with email server application 20 or an applet/application that is executed within email server application 20.

The instruction sets and subroutines of email server application 20, which may be configured as one or more software modules, and which may be stored on storage device 16 coupled to server computer 12 may be executed by one or more processors (not shown) and one or more memory architectures (not shown) incorporated into server computer 12.

While the email sharing process is shown and described as residing on, and being executed by, server computer 12, other implementations may equally be utilized. For example, the email sharing process may be a client-side process stored on one or more storage devices (e.g., storage devices 30, 32, 34, 36) coupled to one or more client electronic devices (e.g., client electronic devices 38, 40, 42, 44; respectively). In such an implementation, the email sharing process may be a stand alone application that interfaces with an email client application (e.g., one or more of email client application 22, 24, 26, 28) or an applet/application that is executed within an email client application. As such, the email sharing process may be a server-side process executed on server computer 12, a client-side process executed by one or more client electronic device (e.g., one or more of client electronic devices 38, 40, 42, 44), or a hybrid client-side/server-side process, executed in part by server computer 12 and one or more client electronic device (e.g., one or more of client electronic devices 38, 40, 42, 44).

The instruction sets and subroutines of email client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may access email server application 20 and may allow users to e.g., created, receive, and manage email messages.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

Figure 2:
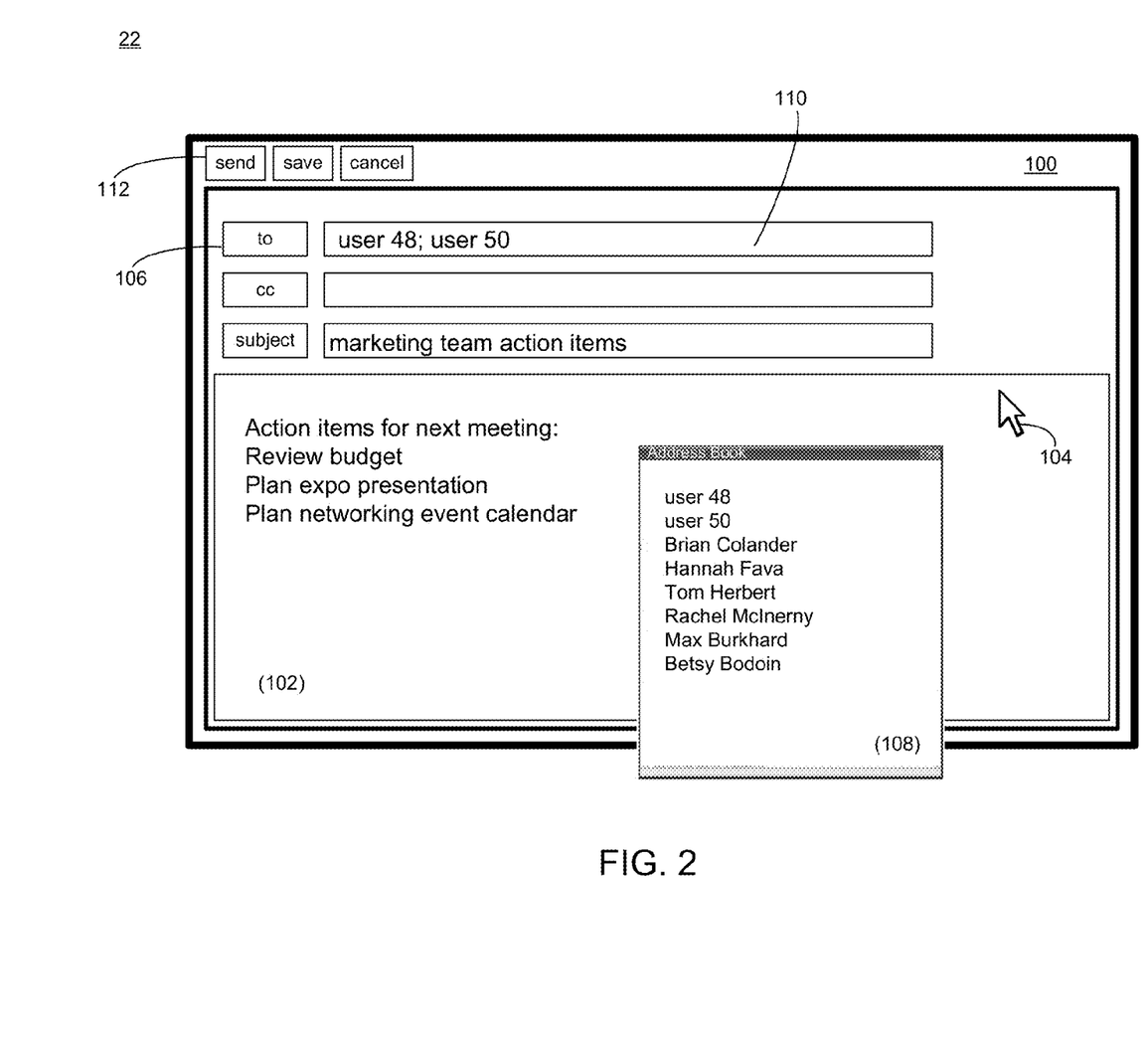
FIG. 2 is a diagrammatic view of a display screen rendered by the email client application and/or the email server application of FIG. 1.

Referring also to FIG. 2, email client application 22 may allow an email user, e.g., user 46, to compose, via visual emailing interface 100, email message 102. Through visual emailing interface 100, user 46 may compose email message 102 and address email message 102 to one or more email users (e.g. user 48, user 50). When composing emails, user 46 may select the email users to whom the email is directed. For example, user 46 may select, via on-screen pointer 104 (which is controlled by a pointing device such as a mouse; not shown), the desired recipients of email message 102, e.g., from an address book or corporate directory associated with one or more of email client application 22 and email server application 20. For example, user 46 may select, via on-screen pointer 104, "to" button 106 on visual emailing interface 100. Once selected, email server application 20 and/or email client application 22 may render pop-up window 108. While pop-up window 108 is shown to include only the names of seven email users, this is for illustrative purposes only and is not intended to be a limitation of this disclosure, as the number of email users included within pop-up window 108 may be increased or decreased depending on the design criteria and user need. User 46 may select, e.g., via on-screen pointer 104, the email users for receiving email message 102. Accordingly, for example, email message 102, regarding marketing team action items, may be directed to email users who are members of the marketing team, e.g., user 48 and user 50.

Email client application 22 (alone or in combination with email sharing process 10 and/or email server application 20) may enable user 46 to send email message 102 to the above-described intended email users. Via email client application 22 (alone or in combination with email sharing process 10 and/or email server application 20), user 46 may send email 102 to user 48 and user 50, as defined within "to" field 110 of email message 102, e.g., by selecting, via on-screen pointer 104, "send" button 112. Upon user 46 selecting "send" button 112, email client application 22 (alone or in combination with email sharing process 10 and/or email server application 20) may send email 102 to the intended email users, e.g., user 48 and user 50.

As discussed above, upon selecting "send" button 112, email message 102 from user 46 may be sent to e.g., user 48 and user 50. However, an email message was not sent to user 52, who was not included as a recipient of email message 102. Assume for illustrative purposes that user 52 is a new employee of Company X and, unfortunately, many users forget to include user 52 on emails. Further, assume that user 46, user 48, user 50, and user 52 all work within the same marketing group of Company X. Therefore, user 52 should most likely receive the emails that user 46, user 48 and user 50 receive. Additionally, assume that user 48 is the mentor of user 52, who is a new hire of Company X and mentee of user 48.

Figure 3:
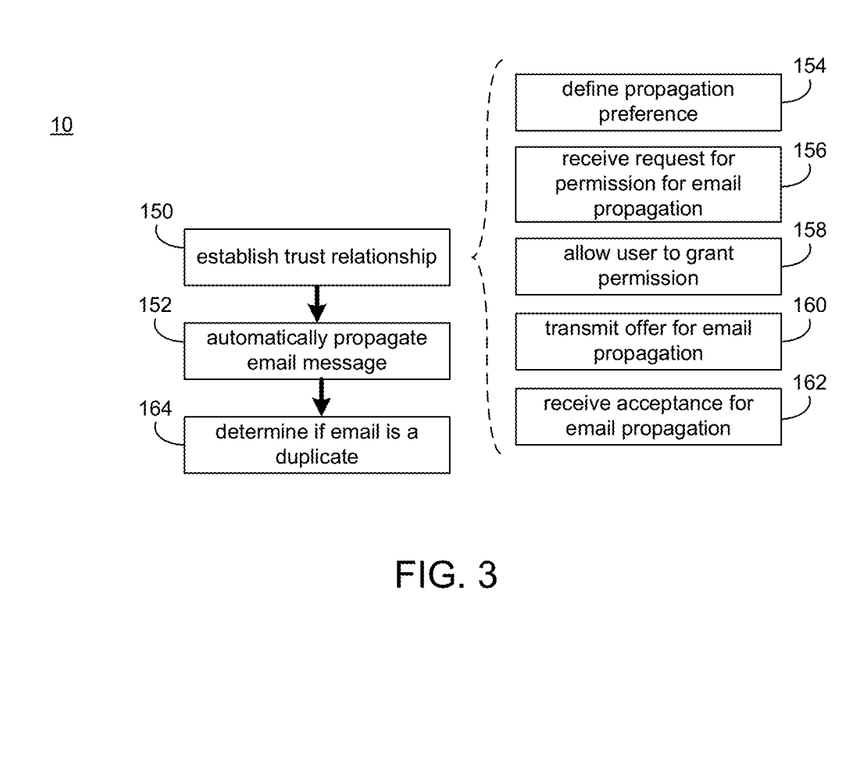
FIG. 3 is a flowchart of the email sharing process of FIG. 1.

Referring also to FIG. 3 and as discussed above, email sharing process 10 may allow for the establishment 150 of a trust relationship between a first email user (user 52) and at least a second email user (user 48). Email sharing process 10 may automatically propagate 152 email messages for the second user (e.g., user 48) to the first user (e.g., user 52) based upon, at least in part, the trust relationship.

Once a trust relationship is established 150 between the two users (e.g. user 48 and user 52), email sharing process 10 may allow one or more of the users, an administrator, or the like, to define 154 one or more propagation preferences (to be discussed below in greater detail) that may allow for the automated propagation 152 of email messages from, e.g., user 48 to user 52. Since, as discussed above, user 52 is the mentee of user 48, it may be desirable for mentee user 52 to receive the same emails as mentor user 48. Accordingly, it may be desirable for all (or some) of the email messages received by user 48 to be automatically propagated 152 (e.g., be forwarded) to user 52, thus allowing user 52 to review and (if desired) respond to one or more of the email messages which user 48 has received. Further, it may be desirable for user 52 to receive all (or some) of the email messages that are sent by user 48.

When establishing 150 a trust relationship between e.g. user 48 and user 52, email sharing process 10 may receive 156 a request from the first user (e.g., from user 52), requesting that the second user (e.g., user 48) grant permission for at least a portion of user 48's email messages to be automatically propagated 152 to user 52. Further, when establishing 150 the trust relationship, email sharing process 10 may allow user 48 to grant permission 158 for at least a portion of his email messages to be automatically propagated 152 to user 52.

For example, if user 52 would like to have email messages of user 48 automatically propagated 152, user 52 may send a request (e.g., which may be received 156 by email sharing process 10, and forwarded to user 48) that user 48 grant permission for at least a portion of email messages to be automatically propagated 152 to user 52. Accordingly, and referring also to FIG. 4, email sharing process 10 may render (alone or in conjunction with one or more of email client application 24 and/or email server application 20) request window 200 that, e.g., informs user 48 that user 52 would like to receive at least a portion of the email messages of user 48. Further, prior to user 48 granting 158 permission to user 52, no such email messages will be automatically propagated 152 to user 52. If user 48 finds this trust relationship acceptable, user 48 may enter into the trust relationship by selecting "accept" button 202. In the event that user 48 selects, via on-screen pointer 104, "accept" button 202, email sharing process 10 may render propagation preference definition window 204 that allows user 48 to define 154 propagation preferences (to be discussed below in greater detail) concerning which email messages may be automatically propagated 152 to user 52.

Additionally, trust relationships need not be unidirectional. For example, a bidirectional trust relationship may be established between user 48 and user 52 in which all (or a portion of) email messages of user 48 may be automatically propagated 152 to user 52 and all (or a portion of) email messages of user 52 may be automatically propagated 152 to user 48.

Additionally, when establishing 150 a trust relationship between the first user (e.g., user 52) and the second user (e.g. user 48), email sharing process 10 may transmit 160 an offer to the first user (e.g., user 52) for at least one email message to be automatically propagated 152 from the second user (e.g., user 48). Further, when establishing 150 the trust relationship, email sharing process 10 may receive 162 an acceptance from the first user (e.g., user 52) for at least one email message to be automatically propagated 152 from the second user (e.g., user 48).

Figure 5:
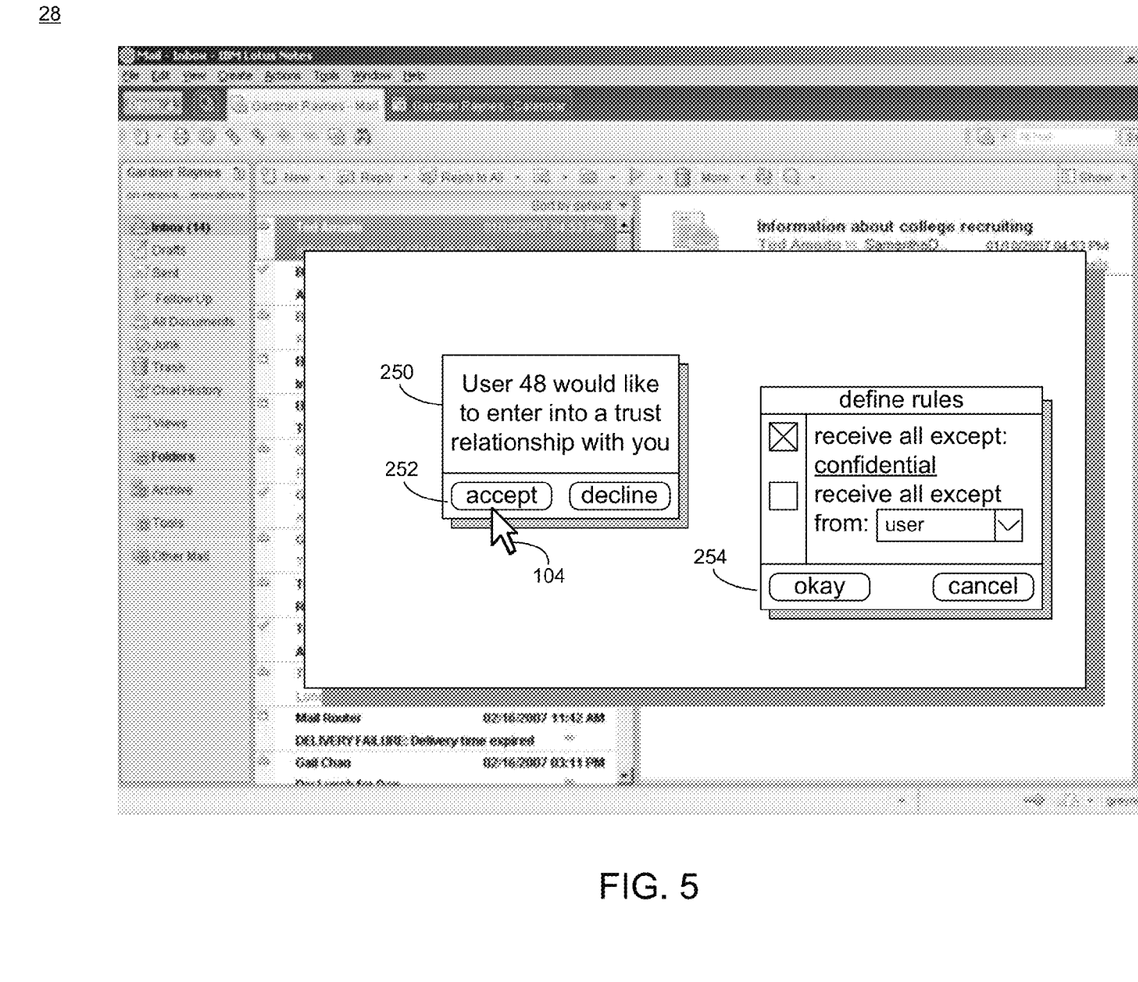
FIG. 5 is a diagrammatic view of a display screen rendered by the email sharing process, the email client application and/or the email server application of FIG. 1.

For example and referring also to FIG. 5, if user 48 would like to automatically propagate email messages to user 52, user 48 may make an offer (e.g., via email sharing process 10 and/or email server application 20) that at least a portion of user 48's email messages be automatically propagated 152 to user 52. Accordingly, email sharing process 10 may transmit 160 user 48's offer of email propagation to user 52. For example, email sharing process 10 (alone or in conjunction with email client application 28 and/or email server application 20) may render offer window 250 that, e.g., informs user 52 that user 48 would like to propagate at least a portion of user 48's email messages to user 52. If user 52 finds this trust relationship acceptable, user 52 may enter into the trust relationship by selecting, via on-screen pointer 104, "accept" button 252. In the event that user 52 selects, via on-screen pointer 104, "accept" button 252, email sharing process 10 may render propagation preference definition window 254 that may allow user 52 to define 154 propagation preferences (to be discussed below in greater detail) concerning which email messages may be automatically propagated 152 to user 52. Further, prior to email sharing process 10 receiving 162 user 52's acceptance of email message propagation from user 48, no such email messages will be automatically propagated 152 to user 52.

In addition to automatically propagating email messages to one or more individual users, an email recipient may wish to automatically propagate email to groups of users. For example, a supervisor may wish to propagate email to his entire team. Email sharing process 10 may establish 150 a trust relationship between the supervisor and the members of his team, either via the above-discussed offer-acceptance mechanism (e.g., wherein the various members of the team must affirmatively accept the offer to receive email from the supervisor), and/or may establish 150 the trust relationship based upon the supervisors hierarchical status relative to his team (e.g., which may be discerned from a corporate directory, such as an LDAP directory that may include title, rank/pay grade, and/or other information denoting relative hierarchical position). As such, a trust relationship may be established 150 between the supervisor and his team (e.g., which may be defined as individuals reporting to the supervisor). As such, changes in the supervisor's team (e.g., as people are added to the team and/or leave the team) may be automatically reflected in the established 150 trust relationship. For example, a new member of the team may be reflected in the LDAP directory as an individual who reports to the supervisor. As such, email sharing process 10 may establish 150 a trust relationship between the new member of the team and the supervisor, e.g., without the need for the supervisor to take any action relative to the new member. As discussed below, the supervisor may define 154 propagation preferences, e.g., which may, at least in part, determine which emails may be forwarded to the supervisor's team (e.g., propagate all email from client ABC).

As discussed above, when establishing 150 a trust relationship between e.g. user 48 and user 52, email sharing process 10 may enable the users to define 154 at least one propagation preference. The at least one email message may be automatically propagated 152 based upon, at least in part, the at least one propagation preference. Accordingly, email sharing process 10 may allow user 48 and/or user 52 to define 154 propagation preferences concerning the manner in which email messages are automatically propagated 152 between the users.

For example, email sharing process 10 may allow user 48 and/or user 52 to define 154 propagation preferences based upon, at least in part, an attribute of the at least one email message. Attributes of the at least one email message may include, but are not limited to, for example, attributes relating to individuals associated with the email (e.g., sender, recipients, carbon copy recipients, or the like), email status (e.g., high priority, confidential, restricted distribution, and the like), categorization of the email (e.g., based upon a tag associated with the email, such as "personal," "marketing," or the like; and/or based upon a subject of the email, discerned from the subject field of the email, or from text of the email).

Figure 4:
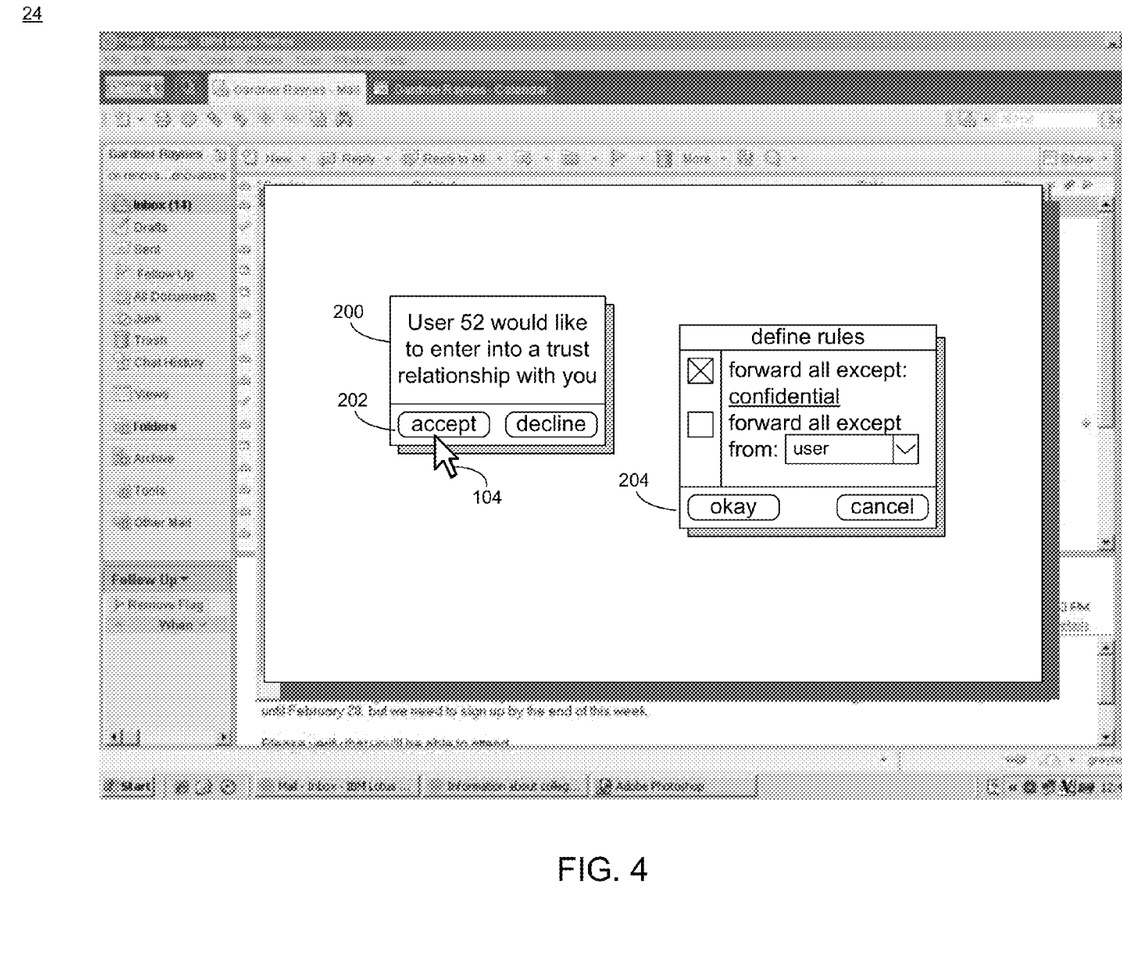
FIG. 4 is a diagrammatic view of a display screen rendered by the email sharing process, the email client application and/or the email server application of FIG. 1.

For example, one or more of user 48 and user 52 may select, via preference definition windows 204, 254, respectively, to automatically propagate 152 all email messages except those indicated as being confidential. While preference definition windows 204, 254 are only shown including a single email attribute-based propagation preference (namely "all except confidential"), this is only intended for illustrative purposes, and should not be construed as a limitation of this disclosure, as the number and nature of email attribute-based propagation preferences may vary according to user need and design criteria. For example, email sharing process 10 may allow user 48 and/or user 52 to define category-based propagation preferences (e.g., based upon, at least in part the subject field of the email message, and/or key words within the body of the email message, and/or tags associated with the email). Accordingly, propagation preferences may be defined 154 concerning specific topics or subjects (e.g. marketing, company administration, meetings, etc.), such that email messages adhering to certain topic-defined criteria may be e.g. filtered prior to transmission or filtered upon receipt.

Additionally, email sharing process 10 may allow user 48 and/or user 52 to define 154 propagation preferences based upon, at least in part, an attribute of an original sender of the at least one email message. For example, email sharing process 10 may allow user 48 to define 154 (e.g., via a pull-down menu, or the like, in preference definition window 204) a propagation preference that automatically propagates 152 all email messages to user 52 except email messages from user 52's supervisor, or email messages from Betsy Bodoin or Max Burkhard who are personal friends of user 48. Further, if the established 150 trust relationship is a bidirectional relationship, email sharing process 10 may allow user 52 to define 154 (e.g., via a pull-down menu, or the like, in preference definition window 254) one or more propagation preferences that automatically forwards to user 48 email messages except those from John Browning, Tom Coleman, and Seth Pressman, who are all members of the mentee group to which user 52 was assigned when he was hired by Company X.

In addition to defining 154 propagation preferences to automatically propagate 152 email messages from one or more individual users, user 48 and/or user 52 may define 154 a propagation preference to automatically propagate 152 all email messages sent from a defined group of users and/or included a defined group of users as recipients. Such groups of users may include, for example, email distribution groups (i.e., which may be defined by an individual user, a system administrator, or system-wide, e.g., in a corporate directory such as an LDAP directory), organizational groups (e.g., a corporate departments which may be defined in a corporate directory such as an LDAP directory), and/or groups based upon one or more user attributes (e.g., title, organizational connection, rank/pay grade, etc.), which may, for example, be discerned based upon, at least in part, information which may be contained in a directory, such as a corporate LDAP directory.

In addition/as an alternative to the above-described groups of users that may be based upon, at least in part, groups and/or attributes defined within an LDAP directory, email sharing process 10 may allow propagation preferences to be defined 154 based upon, at least in part, a social network defined for one or more of the first email user and the second email user. The social network for the first email user and/or the second email user may include those individuals with whom the respective email users interact. Such interactions may include, but are not limited to, a history of communications across various communication channels (e.g., email, instant messaging, telephone, and the like), inclusion on the email users respective instant messaging buddy list, attendance at the same meetings (e.g., as indicated by commonly scheduled events in respective calendaring applications), working together on the same projects, and so on. Various interactions of the respective email users may be monitored, and a social network defined by, various social networking applications and/or suites, such as, for example IBM Lotus Connections, Microsoft SharePoint®, Facebook®, LinkedIn®, MySpace®, Twitter® (SharePoint is a registered trademark of Microsoft Corporation in the United States, other countries, or both; Facebook is a registered trademark of Facebook, Inc. in the United States, other countries, or both; LinkedIn is a registered trademark of LinkedIn, Ltd. in the United States, other countries, or both; MySpace is a registered trademark of MySpace, Inc., in the United States, other countries, or both; Twitter is a registered trademark of Twitter, Inc. in the United States, other countries or both).

For example, user 48 and/or user 52 may define 154 a propagation preference to automatically propagate 152 all email messages sent from a defined group of users and/or including a defined group of users as recipients, in which the group of users is based upon, at least in part, a social network defined for user 48 and/or user 52. The group of users may include a subset of the social network defined for user 48 and/or user 52. For example, the group of users may only include those people within the social network that also work for the same company as user 48 and user 52, that have a specified degree of closeness to user 48 and/or user 52 (e.g., who communicate with user 48 and/or user 52 with a specified frequency), or the like.

Further, while the above-discussed propagation preferences concern sender-side propagation preferences that filter the outgoing email messages stream, other configurations are possible and are considered to be within the scope of this disclosure. For example, email sharing process 10 may allow user 48 and/or user 52 to define 154 receiver-side propagation preferences that filter the incoming email message stream. For example, suppose user 48 failed to define 154 the above-described propagation preference in which email messages from Betsy Bodoin or Max Burkhard are filtered prior to being automatically propagated 152 to user 52, user 52 may define 154 a receiver-side propagation preference that filters email messages from Betsy Bodoin and Max Burkhard upon receipt by user 52.

While preference definition windows 204, 254 are only shown including one sender-based preference (namely to automatically propagate all email "except from"), this is for illustrative purposes only and should not be construed as a limitation of this disclosure, and the number and nature of sender-based preferences included within preference definition windows 204, 254 may vary according to user need and design criteria. Further, while email sharing process has been described as allowing email attribute-based, and sender-based preferences to be defined, this is also only intended for illustrative purposes. The number and nature of parameters that may be considered for defining automatic propagation preferences may vary according to user need and design criteria. Additionally, chaining preferences may also be implemented, including "and", "or", and/or "not" statements. For example, email sharing process 10 may automatically propagate 152 email including: Tom Smith AND Susan Jones as recipients OR including Client ABC in the email message subject. Other variations of propagation preferences utilizing "and", "or", "not" statements may also be defined 154. Propagation preferences may also be defined 154 utilizing email attributes other than email recipients. For example, propagation preferences may be defined 154 based upon, at least in part, email subject, originating domain, email priority, time/date during which propagation should occur, and the like.

Additionally, email sharing process 10 may allow user 48 and/or user 52 to define 154 propagation preferences based upon, at least in part, an event, status, or the like. For example, user 48 may define 154 a propagation preference to automatically propagate 152 email when user 48 has set an email out of office notification, e.g., via email client application 24. As such, whenever an email is sent to user 48, email client application 24 may automatically sent a reply to the sender, alerting the sender that user 48 is out of the office (e.g., and may also include an indicator of when user 48 plans to return to the office). Based upon the defined 154 propagation preference to automatically propagate 152 email to user 52 when user 48 has set an email out of office notification, whenever user 48 has set the email out of office notification, email sharing process 10 may automatically propagate 152 email sent to user 48, to user 52 (e.g., who may be a peer of user 48 and may attend to important email as user 48's proxy).

Email sharing process 10 may determine 164 if the at least one email message is a duplicate email. For example, user 52 may have multiple trust relationships with other email users. Accordingly, if two or more of the other email users receive the same email message, email sharing process 10 may determine 164 that the email message to be automatically propagated 152 is a duplicate and only one copy of the email may be propagated 152 to user 52. For example, the email may be automatically propagated 152 to user 52 from only a single user (e.g., user 48) with whom user 52 has a trust relationship. Additionally/alternatively, while a copy of the email message may be automatically propagated 152 to user 52, email sharing process (e.g., in conjunction with email client application 28) may only display a single copy of the propagated email in user 52's email inbox, and/or indicate that additional copies are duplicates.

Email sharing process 10 may maintain a record of the various established 150 trusted relationships, and the various rules and preferences for automatically propagating 152 email to users. Additionally/alternatively, email sharing process 10 (alone or in conjunction with email server application 20 and/or one or more email client application 22, 24, 26, 28) may maintain a record email transactions (e.g., what email messages are automatically propagated 152 to which users), for example, which may include email sharing process 10 receiving reports of automatically propagated 152 email messages from one or more of email server application 20 and/or one or more email client application 22, 24, 26, 28. As such email sharing process 10 (alone or in conjunction with email server application 20 and/or one or more email client application 22, 24, 26, 28) may maintain and/or be capable of generating an email distribution history. Accordingly, it may be possible to determine what email content has been distributed to which users. While possible mechanisms for tracking email distribution have been described above, various additional/alternative mechanisms are possible consistent with the present disclosure.

While the system is described above as automatically propagating 152, from user 48 to user 52, email messages received by user 48, other configurations are possible and are considered to be within the scope of this disclosure. For example, the email messages automatically propagated 152, e.g. from user 48 to user 52, may include one or more email messages sent by user 48 (as opposed to an email message received by user 48). Accordingly, in the event that user 48 sends an email regarding a project that users 46, 48, 50, 52 are all working on and user 48 inadvertently forgets to include user 52 on the email, upon user 48 sending the email message to users 48, 50, email sharing process 10 may automatically propagate 152 to user 52 the email message sent by user 46.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   establishing, via a computing device, a trust relationship between a first email user and at least a second email user, wherein establishing the trust relationship between the first email user and the second email user includes:
   sending, between the first email user and the second email user, an offer through one or more visual windows defining the trust relationship, wherein the one or more visual windows include one or more selectable rules defining which one or more email messages to propagate between the first email user and the second email user; and receiving an acceptance of the offer and a selection of the one or more selectable rules through the one or more visual windows, wherein the acceptance of the offer establishes the trust relationship.

2. The method of claim 1 further comprising automatically propagating at least one email message received by the second email user to the first email user based upon, at least in part, the trust relationship.

3. The method of claim 2, wherein establishing the trust relationship further includes allowing the second email user to grant permission for the at least one email message to be automatically propagated to the first email user.

4. The method of claim 2, wherein establishing the trust relationship further includes transmitting the offer to the first email user for the at least one email message to be automatically propagated from the second email user.

5. The method of claim 4, wherein establishing the trust relationship further includes receiving the acceptance from the first email user for the at least one email message to be automatically propagated from the second email user.

6. The method of claim 2, wherein the trust relationship is based upon, at least in part, at least one of:
an attribute of an original sender of the at least one email message; and
an attribute of the at least one email message.

7. The method of claim 2, wherein establishing the trust relationship further includes receiving a request that the second email user grant permission for the at least one email message to be automatically propagated to the first email user.

8. The method of claim 2, further comprising determining if the at least one email message is a duplicate email.

9. The method of claim 1, wherein the trust relationship includes a bidirectional trust relationship and at least one email message received by the first email user is propagated to the second email user based upon, at least in part, the bidirectional trust relationship.

10. A computer program product residing on a non-transitory computer readable medium having a plurality of instructions stored thereon which, when executed by a processor, cause the processor to perform operations comprising:
establishing, via a computing device, a trust relationship between a first email user and at least a second email user, wherein establishing the trust relationship between the first email user and the second email user includes:
sending, between the first email user and the second email user, an offer through one or more visual windows defining the trust relationship, wherein the one or more visual windows include one or more selectable rules defining which one or more email messages to propagate between the first email user and the second email user; and
receiving an acceptance of the offer and a selection of the one or more selectable rules through the one or more visual windows, wherein the acceptance of the offer establishes the trust relationship.

11. The computer program product of claim 10 further comprising automatically propagating at least one email message received by the second email user to the first email user based upon, at least in part, the trust relationship.

12. The computer program product of claim 11, wherein establishing the trust relationship further includes allowing the second email user to grant permission for the at least one email message to be automatically propagated to the first email user.

13. The computer program product of claim 11, wherein establishing the trust relationship further includes transmitting the offer to the first email user for the at least one email message to be automatically propagated from the second email user.

14. The computer program product of claim 13, wherein establishing the trust relationship further includes receiving the acceptance from the first email user for the at least one email message to be automatically propagated from the second email user.

15. The computer program product of claim 11, wherein the trust relationship is based upon, at least in part, at least one of:
an attribute of an original sender of the at least one email message; and
an attribute of the at least one email message.

16. The computer program product of claim 11, wherein establishing the trust relationship further includes receiving a request that the second email user grant permission for the at least one email message to be automatically propagated to the first email user.

17. The computer program product of claim 11, further comprising determining if the at least one email message is a duplicate email.

18. The computer program product of claim 10, wherein the trust relationship includes a bidirectional trust relationship and at least one email message received by the first email user is propagated to the second email user based upon, at least in part, the bidirectional trust relationship.

19. A computing system including a processor and memory configured to perform operations comprising:
establishing, via a computing device, a trust relationship between a first email user and at least a second email user, wherein establishing the trust relationship between the first email user and the second email user includes:
sending, between the first email user and the second email user, an offer through one or more visual windows defining the trust relationship, wherein the one or more visual windows include one or more selectable rules defining which one or more email messages to propagate between the first email user and the second email user; and
receiving an acceptance of the offer and a selection of the one or more selectable rules through the one or more visual windows, wherein the acceptance of the offer establishes the trust relationship.

20. The computing system of claim 19 further comprising automatically propagating at least one email message received by the second email user to the first email user based upon, at least in part, the trust relationship.

21. The computing system of claim 20, wherein the trust relationship is based upon, at least in part, at least one of:
an attribute of an original sender of the at least one email message; and
an attribute of the at least one email message.

22. The computing system of claim 20, wherein establishing the trust relationship further includes receiving a request that the second email user grant permission for the at least one email message to be automatically propagated to the first email user.

23. The computing system of claim 19, wherein the trust relationship includes a bidirectional trust relationship and at least one email message received by the first email user is propagated to the second email user based upon, at least in part, the bidirectional trust relationship.

* * * * *